Aug. 26, 1969     A. J. DE MARIA     3,464,027

LASER MODULATION BY FOCUSED ACOUSTIC ENERGY

Filed Sept. 14, 1965     2 Sheets-Sheet 1

*INVENTOR.*
ANTHONY J. DEMARIA

BY Donald J. Bradley

ATTORNEY

*INVENTOR.*
ANTHONY J. DeMARIA

BY Donald F. Bradley

ATTORNEY

United States Patent Office 3,464,027
Patented Aug. 26, 1969

3,464,027
LASER MODULATION BY FOCUSED ACOUSTIC ENERGY
Anthony J. De Maria, West Hartford, Conn., assignor to United Aircraft Corporation, East Hartford, Conn., a corporation of Delaware
Filed Sept. 14, 1965, Ser. No. 487,181
Int. Cl. H01s 3/10
U.S. Cl. 331—94.5          9 Claims

ABSTRACT OF THE DISCLOSURE

A time-varying refractive index perturbation is generated internal to a laser medium for modulating or gating the laser. A curved ceramic transducer is bonded to the laser, and an acoustic wave of wavelength approximately equal to the width of the laser beam is focused within the laser medium.

---

Figure 1:
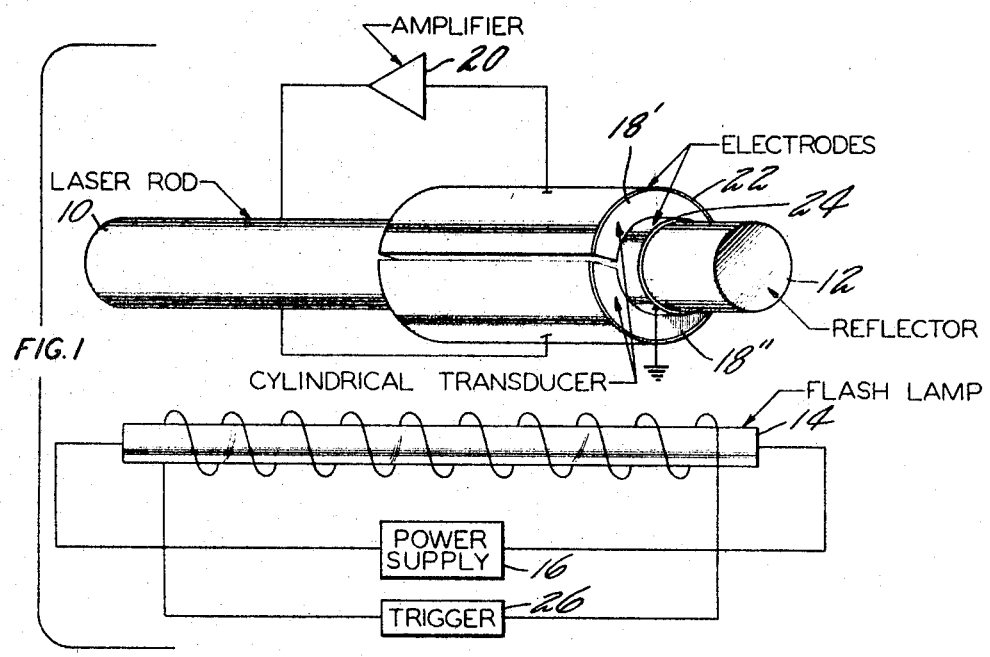

This invention relates to the gating or modulation of lasers, and particularly to a method and apparatus for gating the output of high gain lasers by propagating a time-varying refractive index perturbation having a wavelength approximately equal to the beam width of the laser beam internally within the laser medium. Such internal modulation also eliminates the introduction of lossy elements into the laser feedback cavity.

Interest in the utilization of lasers for such applications as range measurements, surveillance, communication and welding has directed attention to the problems associated with controlling the output radiation from these quantum devices. Techniques and devices used in the past for laser output control with varying degrees of success include ultrasonic acoustic cells, Kerr cells, Pockel cells, rotating discs and mirrors, and hair-trigger mode operation. Of these techniques, the ultrasonic acoustic cell has produced the most significant results with respect to modulation and scanning of the laser output. Normally the laser output modulating devices are inserted into the optical feedback cavity of the laser, or are external to the laser itself, and thereby decrease the output laser energy by as much as 60% as a result of losses introduced into the output intensity because of scattering, discontinuities in the refractive index, and reflection losses.

By generating a refractive index perturbation within the laser medium itself the introduction of such lossy elements into the laser feedback cavity is avoided. The most direct way to generate such refractive index perturbations within the laser medium is by means of an acoustic wave focused within the laser medium, and this invention will be described with relation thereto, although it should be noted that other means for producing such perturbations such as electric or magnetic fields may also be used. The density variation associated with focused acoustic waves produces the periodic fluctuation of the refractive index. The resulting periodic refraction index gradient within the laser optical feedback path acts as a Q-spoiler and thus modulates the laser output intensity.

Interaction of acoustic waves with light is known to produce refraction, diffraction, frequency translation and polarization. Refraction and diffraction of light in liquids and solids and the rotation of the index ellipsoid of crystalline quartz by acoustic waves have been used to control the amount of feedback in a laser Fabry-Perot interferometer for gating, amplitude modulating and frequency shifting the output radiation of the quantum device. Likewise refraction and diffraction of light by acoustic waves for nonmechanically deflecting a light beam is known.

The ratio of the light beam width (W) to acoustic wavelength ($\Lambda$) determines whether refraction or diffraction occurs. When $W/\Lambda \ll 1$, refraction occurs; when $W/\Lambda \gg 1$, diffraction predominates. However, until the present invention it has not been recognized that laser action may be controlled where the light beam width (W) is approximately equal to the acoustic wavelength ($\Lambda$).

This invention utilizes the phenomenon that if a plane-parallel light beam is propagated through an acoustic wave such that W is comparable to $\Lambda$, various rays of the light beam will be refracted by different amounts. Since maximum refraction occurs at the nodal points, i.e. points of maximum pressure gradient, and zero refraction at the antinodal points, i.e. points of zero pressure gradient, various portions of the time-varying refractive index set-up by the compressions and rarefactions of the acoustic waves contribute to the reaction such as to converge segments of the light beam to a point. In other words, interaction of a laser light beam with an acoustic wave where the light beam width W is comparable to the acoustic wavelength $\Lambda$ produces a focusing effect of the light beam which can be used to modulate, gate or control the beam, and an effect resembling a dynamic lens with a time-varying focal length can be obtained.

While the preferred embodiment of the invention utilizes focused acoustic waves for internally modulating laser output intensity, and this internal modulation results in a substantially lossless gating method, modulation by the above described focusing effect may also be produced external to the laser medium if optical losses can be tolerated, and may in some cases be preferred.

In a preferred embodiment for generating a time-varying refractive index perturbation internal to the laser medium a curved ceramic transducer is bonded to the cylindrical laser rod to focus ultrasonic energy within the laser rod.

It is therefore an object of this invention to provide a novel method and apparatus for modulating the output of a laser.

A further object of this invention is a novel laser modulator in which a time-varying refractive index perturbation is generated internal to the laser medium.

Another object of this invention is a laser modulator in which interaction between the laser beam and an acoustic wave of the wavelength $\Lambda$ comparable to the light beam width W produces a focusing effect of the light beam.

A further object of this invention is a novel method and apparatus for gating the output of a laser without introducing lossy elements in the feedback cavity.

A still further object of this invention is a novel curved transducer for focusing ultrasonic energy into a laser rod to modulate the laser output.

Figure 2:
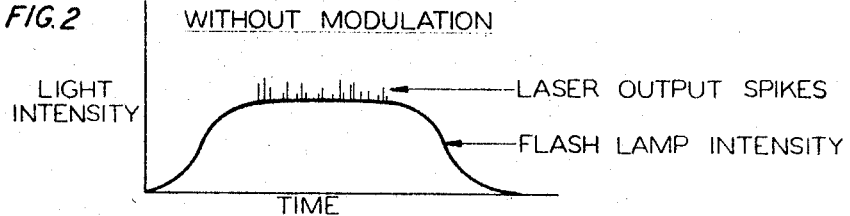
Figure 3:
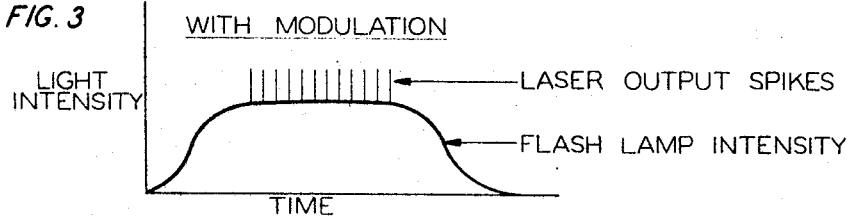
Figure 4:
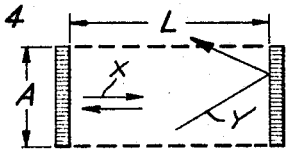

These and other objects and a complete understanding of various modifications of this invention may be had by referring to the following description and claim, read in conjunction with the accompanying drawings, in which:

FIGURE 1 is a schematic diagram of the preferred embodiment of this invention; and FIGURE 2 shows graphically a typical laser output without application of ultrasonic focusing; and FIGURE 3 shows graphically a laser output after application of ultrasonic focusing; and FIGURES 4 thru 7 explain the operation of a laser modulated by focused acoustic waves.

Referring particularly to FIGURE 1 there is shown a solid state laser rod 10, the rod being for example neodymium doped Barium Crown glass of .84 cm. diameter. One end of the rod 10 is heavily silvered to form a reflector 12, while the other end is uncoated. As known in the laser art, the ends of the rod 10 are plane parallel. If a relatively long rod is used, the high gain allows the laser to oscillate with just the reflectivity arising from the refractive index discontinuity at the glass-air interface. Feedback may also be produced conventionally using two external parallel reflectors.

The rod is optically pumped by a xenon flash lamp 14 powered by power supply 16. A tubular or cylindrical transducer 18 such as BaTiO₃ for example shown in two semicircular halves 18' and 18" is mechanically bonded directly to the laser rod 10 by any appropriate adhesive such as epoxy. One section of the transducer 18' is used as a driver and the other section 18" is used as a pickup element. Any type of transducer which can be formed into the desired shape may be used, and ceramic transducers are therefore preferred. The transducer is driven by applying a voltage thereto.

As shown in FIGURE 1 a feedback principle may be used to drive the transducer, but other driving techniques such as direct application of a voltage across the transducer are acceptable. The feedback technique utilizes an amplifier 20 which responds initially to background noise to produce a voltage which is then fed from the amplifier to one-half of the transducer 18'. This voltage is generated across the transducer half 18' between the outer electrode 22 and grounded inner electrode 24 to drive the transducer section 18'. The acoustic wave generated by transducer section 18' is picked up by transducer section 18" and a voltage generated in transducer 18" which is again fed to amplifier 20, and the amplified output delivered to transducer section 18'. The tuning frequency of the applied voltage is a function of the transducer and the electronics. Best results are obtained when the transducer is driven at or close to the natural frequency or a harmonic frequency of the combined transducer and laser rod resonance mode.

Another embodiment consists of a single tubular or cylindrical transducer having electrodes on the inner and outer circumferences and bonded directly to or positioned in contact with the laser rod. A separate voltage source is fed to an oscillator, and the transducer is driven directly from the oscillator via the oscillator voltage which is fed across the electrodes.

The electrodes 22 and 24 may be thin metallic conductive elements such as foil, or may be deposited conductive layers, sufficient to produce the required voltages across the transducer. As shown, the inner electrode may be grounded.

Actuation of the transducer produces an acoustic wave of, for example, 900-kc./sec., the wavelength at this frequency being approximately three-halves the glass rod diameter. This acoustic wave is focused within the laser rod 10, and the density variation associated therewith produces a periodic refractive index gradient fluctuation within the optical feedback path, thus acting as a Q-spoiler to gate the output of the laser. The use of the curved transducer to focus the ultrasonic energy provides a means for obtaining an appreciable refractive index change in a solid laser medium since an increase of greater than a factor of twenty in sound pressure at the focus point of curved transducers can be obtained. Also as a result of the cylindrical rod-like shape of most lasers, the tubular shaped transducer appears best suited for this application.

The resulting focusing effect of the laser beam produced by application of an acoustic wave which generates a time-varying refractive index perturbation within the laser medium occurs if the laser beam width W is approximately equal to the acoustic wavelength Λ. The transition between diffraction, refraction and focusing effects produced by difference $W/\Lambda$ relationships is not precise, but is a gradual transition. The focusing effect predominates when the relationship between W and Λ is $$\frac{1}{10} \leq \frac{W}{\Lambda} \leq 3$$

that is, when the beam width is from 1/10 to 3 times the acoustic wavelength.

FIGURE 2 shows a typical unmodulated laser output as a function of the light intensity of the flash lamp with time. In FIGURE 1 the flash lamp is actuated by means of a trigger circuit 26. Upon actuation, the flash lamp intensity increases from zero to a relatively constant value and then decays back to zero as shown in FIGURE 2. The flash lamp and its associated circuitry are conventional laser pumping apparatus and form no part of the present invention. When the light intensity of the flash lamp is sufficient to cause lasing action, output pulses or spikes are produced as indicated in FIGURE 2. Both the amplitude and pulsating frequency of the laser spikes are random.

FIGURE 3 is a plot similar to FIGURE 2 and shows that the laser pulses or spikes are all equal in amplitude, equal in frequency or spacing, and of an amplitude much higher than those of FIGURE 2 when the laser is internally gated by the focused acoustic energy from transducer 18 having a wavelength Λ comparable to the laser beam width W. The pulsating frequency of the laser pulses is directly related to the frequency of the acoustic wave produced by the transducer.

The improvement in the operating efficiency of the laser when subjected to the acoustic perturbations arises from the entrapment of off-axis rays which would normally be lost to the parallel reflectors Fabry-Perot interferometer, and the reduction in spontaneous emission losses by oscillations over the entire linewidth every half-cycle of the acoustic wave when the refractive index is at a maximum at the center of the laser medium.

In order to determine the effect of a plurality of transducers upon a laser rod, three sets of BaTiO₃ transducers, each set consisting of two halves of a tubular transducer, were bonded onto a test rod. One set was bonded near each end and the third set was bonded in the center to determine which position would have the largest effect on the laser oscillating characteristics. It was found that the position of the transducers along the laser rod was unimportant. Although the three transducers shielded a significant portion of the glass laser rod from the pumping light, since neodymium in a glass bass is a four-level laser system, the shaded portion of the rod does not act as an optical absorber, and no significant change in output was observed.

Figure 5:
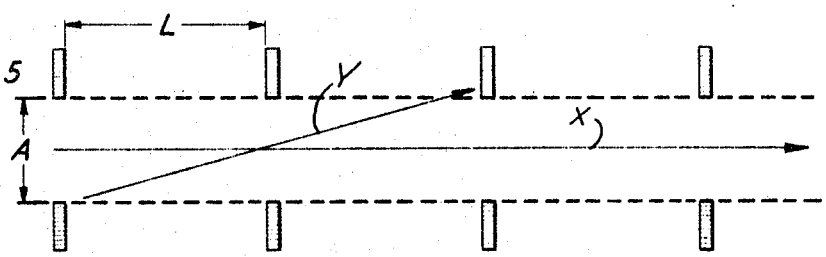

FIGURES 4 thru 7 explain the operation of the laser when modulated by focused acoustic waves. The typical laser configuration shown in FIGURE 4 may be considered to be composed of an infinite series of colinear identical apertures cut into parallel and equally spaced, perfectly absorbing partitions of infinite extent as illustrated in FIGURE 5 where A is the reflector diameter and L is the distance between reflectors. FIGURE 5 is therefore a transmission line analog of the laser. Light rays X propagating perpendicular to the apertures propagate through the structure, while rays Y which are off axis are lost to the system due to the "walk-off" effect, i.e., eventually these rays are reflected through the walls of the laser configuration.

Figure 6:
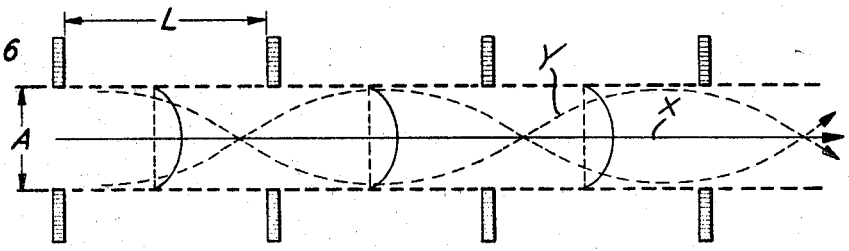

A laser subjected to a periodic refractive index perturbation generated by focused acoustic waves is shown in FIGURE 6. In this figure, one-half an acoustic wavelength is assumed to be generated across the laser medium. The light ray X propagating through the maximum-minimum points of the refractive index perturbations which have a zero gradient will traverse the structure unaffected. Light rays Y which propagate through other portions of the refractive index perturbation will be bent. Off-axis rays which would normally be lost to the system are also refracted and trapped within the laser medium.

There is a continuous variation in the optical path length of the light rays within the Fabry-Perot interferometer resulting from the nonspherical profile of the refractive index perturbation. For example, cylindrically focused waves give rise to a zero order Bessel function profile of the refractive index perturbation, whereas plane acoustic waves give rise to a sinusoidal refractive index variation profile. Such a continuous variation in optical path length for the rays destroys the discrete mode structure of the resonator and allows oscillation over the entire line width during the half cycle when the refractive index is a maximum at the center of the laser medium. The reduction in diffraction, "walk-off," scattering and spontaneous emission losses by this converging wave guide effect results in an increase in output power for the laser oscillator.

Figure 7:
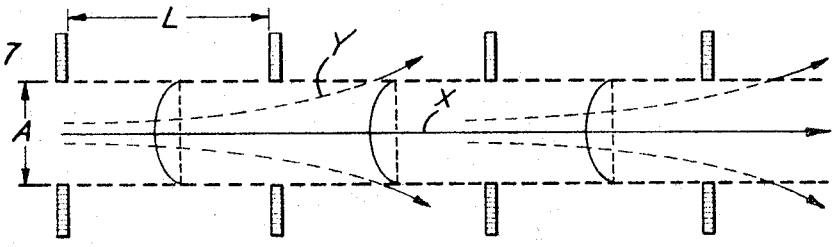

During the next half cycle of the acoustic wave, the refractive index is at a minimum at the center of the laser medium. As a result, the light rays diverge as illustrated in FIGURE 7. The diverging light rays represent a loss to the system and a reduction in the output of the device. If the loss is greater than the gain of the system, the laser is turned off and the output of the laser is thus gated at the acoustic frequency. Such gating has been experimentally demonstrated up to one megacycle per second with a twenty-one inch long glass laser rod.

It is therefore apparent that the use of transducers to focus acoustic energy provides a means for obtaining an appreciable refractive index change in a laser medium. Since most solid state and other laser mediums are cylindrically shaped, the tubular-shaped or curved transducer appears best suited for laser modulation applications. This periodic fluctuation of the refractive index can readily be utilized as a Q-spoiler to gate the output of lasers without the introduction of lossy elements into the feedback interferometer.

It should be noted that any method of generating refractive index perturbations within the laser rod may be used. For example, a cylindrical transducer is not practical with a laser rod having a rectangular cross-section and consequently any type of transducer capable of generating appropriate acoustic waves within the laser medium may be used. And as noted previously, other means of generating appropriate refractive index perturbations either within the laser medium or external to it for producing a focusing effect, i.e. where the perturbations follow the relationship $$\frac{1}{10} \leq \frac{W}{\lambda} \leq 3$$

fall within the scope of the inventive teachings herein.

I claim:
1. Apparatus for modulating the output of a laser comprising a laser rod, means for generating an acoustic wave of predetermined frequency, and means for focusing the acoustic wave internally within the laser rod.

2. Apparatus for modulating the output of a laser comprising a laser rod, a transducer, means for actuating said transducer to generate an acoustic wave, and means for focusing said acoustic wave internally within said laser rod.

3. Apparatus as in claim 2 in which said means for focusing said acoustic wave within said laser rod comprises means for physically coupling said transducer to said laser rod.

4. Apparatus as in claim 2 in which said transducer is cylindrical.

5. Apparatus as in claim 4 in which said transducer comprises two semicylindrical halves.

6. Apparatus as in claim 3 in which said transducer is bonded to said rod.

7. Apparatus as in claim 3 and including an acoustically conducting medium between said transducer and said laser rod.

8. Apparatus as in claim 4 and including first and second electrodes connected respectively to the inside and outside circumferences of said transducer, and means for producing a voltage between said electrodes to actuate said transducer.

9. Apparatus as in claim 2 in which said transducer is ceramic.

References Cited
UNITED STATES PATENTS

| 3,247,386 | 4/1966 | Vickery | 331—94.5 |
| 3,330,956 | 7/1967 | Wade | 332—7.51 |
| 3,354,407 | 11/1967 | Howling | 331—94.5 |

OTHER REFERENCES

De Maria "Ultrasonic Control of Laser Action" Proceedings of the Symposium on Optical Masers, Polytechnic Press, Nov. 27, 1963, p. 253.

RONALD L. WILBERT, Primary Examiner

U.S. Cl. X.R.
250—199; 332—7.51